(12) United States Patent
Torrance

(10) Patent No.: US 9,641,632 B1
(45) Date of Patent: May 2, 2017

(54) METHOD OF STORING A WEB USER ID IN FIRST-PARTY COOKIES

(71) Applicant: Rocket Fuel Inc., Redwood City, CA (US)

(72) Inventor: Mark Charles Torrance, San Jose, CA (US)

(73) Assignee: Rocket Fuel Inc., Redwood City, CA (US)

( * ) Notice: Subject to any disclaimer, the term of this patent is extended or adjusted under 35 U.S.C. 154(b) by 532 days.

(21) Appl. No.: 13/934,180

(22) Filed: Jul. 2, 2013

(51) Int. Cl.
*G06F 15/177* (2006.01)
*H04L 29/08* (2006.01)

(52) U.S. Cl.
CPC .................................. *H04L 67/22* (2013.01)

(58) Field of Classification Search
CPC . H04L 29/08621; H04L 67/146; H04L 67/22; G06Q 30/0242; G06Q 30/0251; G06Q 30/0277; G06Q 30/0241
USPC ................................ 709/245, 223, 224, 203
See application file for complete search history.

(56) References Cited

U.S. PATENT DOCUMENTS

2008/0097830 A1* 4/2008 Kim ...................... G06Q 30/02
                                                    705/14.4
2011/0082824 A1* 4/2011 Allison ................ G06N 99/005
                                                     706/20

* cited by examiner

*Primary Examiner* — Kenneth R Coulter
(74) *Attorney, Agent, or Firm* — Fenwick & West LLP

(57) ABSTRACT

Third party ad servers log a user's web browsing activities. On web pages where the ad server is a third party, the web page's code is configured to provide the ad server read and write access to an advertiser's first party cookie on a user's web browser. The ad server uses this access to read and write a unique user identification number to the cookie. The ad server also maintains a separate copy of the user identification number on a remote server. Correlating the user identification both within the ad server and within the cookies stored in the user's web browser allows the ad server to identify and log the web traffic associated with particular users. This information is useful in a number of contexts, including determining which ad inventory to purchase for which users, and how to value the corresponding ad inventory.

21 Claims, 6 Drawing Sheets

METHOD OF STORING A WEB USER ID IN FIRST-PARTY COOKIES

BACKGROUND

1. Field of the Invention

This invention pertains in general to storing information in a web browser's cookie during a web-browsing session.

2. Description of the Related Art

Online advertising has grown significantly in recent years. Web pages often include space for informational content desired by the web page's visitors (referred to as users, who use the information presented on the web page), as well as space for advertising (ad) content. The advertising space on a web page is generally referred to as ad inventory. The publisher of the web page then offers its ad inventory for sale, directly or indirectly, to advertisers. Advertisers, again directly or indirectly, purchase advertising space to place individual instances of ad content, generally referred to as impressions. Impressions are presented to the user with the hope of inducing the user to perform some desired act including, for example, clicking on an impression, visiting a specific web page, signing up for online services or news from a particular web page, or purchasing merchandise from yet another web page. When the user performs the desired act, the user is deemed to have "converted."

The online advertising industry includes many different types of advertisers that represent companies producing a wide variety of goods and services. The internet has grown rapidly in recent years, and concordantly the supply for ad inventory has also dramatically increased. However, given the wide variety of goods and services to be advertised, not all web pages have ad inventory that is valuable to a given advertiser. Thus, advertisers, often in partnership with third parties such as ad servers, try to identify ad inventory that is valuable to their customers. Ad servers help advertisers target particular web pages and audiences of users, instead of indiscriminately placing ads in front of a large number of users. To do this, ad servers collect statistics regarding user traffic on web pages to make better advertising inventory purchase decisions. These statistics include web pages visited by users and the actions taken by those users on the visited web pages. The goal of such targeted advertising is to increase the likelihood that the users the advertiser advertises to actually convert.

To collect statistics about a user a pixel tag may be embedded in a web page that the user requests. Typically, to embed a pixel tag, a code snippet is placed in the web page that is delivered to the user's web browser. The code snippet may, for example be written in HTML, XML, JavaScript, or any other programming language. When the browser processes the web page, the code snippet is executed (referred to herein as "firing the pixel tag") causing the browser to transmit a message to a server identified in the code snippet. The message may include information regarding the internet protocol (IP) address of the computing device that executes the browser's rendition of the web page, the browser type, a timestamp, and the user's identity among other details. Upon receiving the message, the server can store this information and associate the user's identity with the stored information. However, the server would need a mechanism by which to determine if other information for the same user has already been stored with the server due to the user visiting other web pages that include pixel tags.

Employing web browser cookies is one way that a server can identify a particular user and thereby track the user's browsing activities. A web browser cookie is a few bits of data that an external server, such as a web page hosting server or a third party ad server, often transmits to the user's web browser, in response to a web page request initiated by the user. The web browser then stores this data on the user's computer, and associates the cookie with the external server.

A cookie comprises at least two parameters, namely the name of the cookie and its value. A subsequent request by the user to the same external server will then include this cookie (e.g., its name and value) with the request and transmit it back to the external server. In addition any other cookies (e.g., their names and values) stored on the user's computer that are associated with the same external server are also transmitted back to the external server with the subsequent request. If the user explicitly sends a request to the external server (e.g., the top level "page" requested by the user's browser includes the hostname of the external server), then the external server is referred to as the "first party" of this request and its cookie is a first party cookie.

Restated, if the external server is the same as the entity providing the requested web page, that entity (e.g., the web page hosting server) is the first party of the cookie. In comparison, if in the course of loading a top level web page a Pixel or Image or other piece of supplemental content is requested from a different external server, that entity (e.g., the third party ad server) is referred to as the "third party" and its cookie is a third party cookie. Stated differently, a third party is any server with a web domain different from the first party's web domain.

In all modern web browsers, servers are only allowed to read and write cookies related to their own domain. Some new versions of web browsers, notably Firefox™ and Safari™, are planning to or have already implemented a change which means that third parties can read, but cannot write or update, their own domain cookies when they are serving content in a third party context. This prevents a third party from using first party cookies to identify a user's browsing behavior.

BRIEF SUMMARY OF THE INVENTION

Methods, computing systems, and computer program product code for execution by a processor and storage in a non-transitory computer-readable storage medium each generally relate to techniques for a third party ad server to log a user's web browsing activities. These techniques allow the ad server as a third party to provide a first party with computer code that can access and/or write to an advertiser's first party cookie on the user's web browser. The ad server uses this access to read and write a unique user identification (user ID) to the first party cookie. The user ID may include numbers, letters, or any other character, symbols or combinations thereof. Alternatively, the ad server creates a new first party cookie containing a user ID if no such cookie exists on the user's web browser. The ad server also maintains a separate copy of the user identification number on a remote server. Correlating the user identification both within the ad server and within cookies stored in the user's web browser allows the ad server to identify and log the web traffic associated with particular users. This information is useful in a number of contexts, including determining which ad inventory to purchase for which users, and how much to pay for the ad inventory.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Computing Environment Overview

Figure 1:
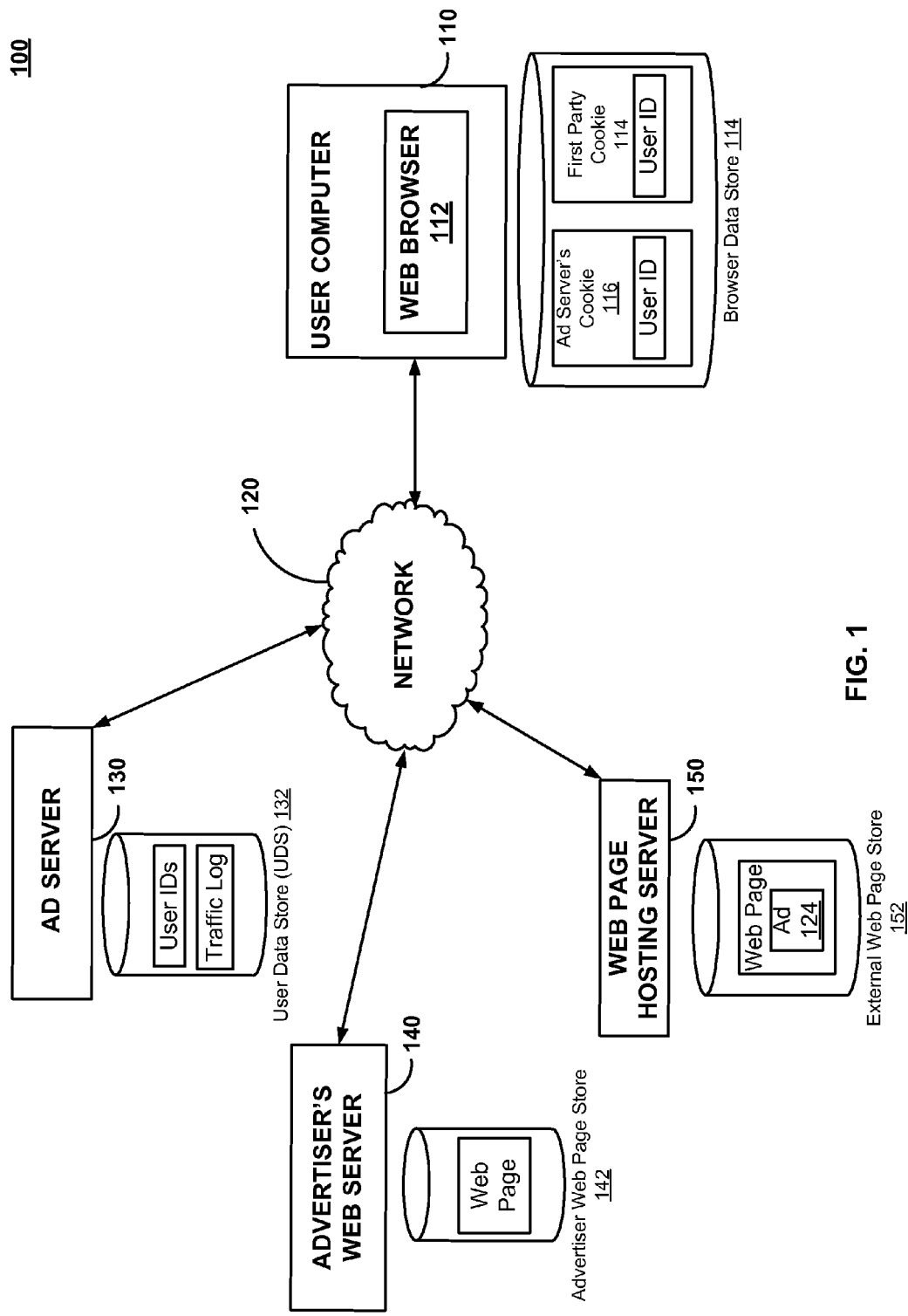
FIG. 1 shows a computing environment configured for allowing an ad server as third party to access an advertiser's first party cookie stored in a user's web browser, according to one embodiment.

FIG. 1 illustrates a computing environment 100 configured for delivering web pages including advertising (ad) content, according to one embodiment. The computing environment 100 includes a number of different computing systems including a user's computer 110, an ad server 130, an advertiser's web server 140, and another web page hosting server 150, all communicatively coupled through a communications network 120 (e.g., the internet). For example, the computing systems may be programmed to communicate with each other using a networking protocol such as transmission control protocol/internet protocol (TCP/IP). Although only one of each type of computing system is shown, in practice many of each type of entity exist on the internet, and the various instances of each type of computing systems interact with each other on a frequent basis.

A user utilizes a computer 110 (e.g., a smart phone, tablet computer, laptop computer, personal computer, etc.) having a web browser (or user agent) software application 112 to access web pages provided by web servers, such as the advertiser's web server 140 or other web page hosting servers 150. Examples of web browsers include Firefox™, Chrome™, Safari™, and Internet Explorer™. For sake of clarity, reference to a user 110 is a reference to the user's computer 110, as a mechanism of abstracting away from the actual human actor controlling the computer 110.

The user's 110 web traffic, including web page visits and actions on those visited web pages, will be locally stored in cookies 114 maintained in a browser data store. In addition to storing web browsing activity, cookies 114 may also store data regarding the type and version of the browser used. Generally, cookies are browser 112 specific, such that each browser 112 will have its own set of stored cookies. Cookies 114 also store user identifying information such as a user ID and/or a user's 110 IP address.

Cookies 114 and 116 are created and stored by the browser 112 at the behest of individual web servers such as the advertisers' web servers 140 and the web page hosting servers 150. Cookies can be temporary, meaning the browser 112 deletes the cookies after the user 110 ends a browsing session by existing the browser 112. In comparison a persistent cookie remains stored with the browser 112 after the user's 110 exists the browser 112, and thus is available to the browser at later times during other web browsing sessions. Generally, a cookie comprises a name and value. In addition, the cookie can comprise additional data, i.e. an expiration date. Cookies are unique to the web server that requested the web browser 112 to create ("set") the cookie. Depending on the current web page requested by the browser 112, cookies can be divided into first and third party cookies.

Web page hosting servers 150 (or web servers) store and communicate web pages to users 110. Web pages are located at particular internet addresses (e.g., at a particular uniform resource locator (URL)), and generally include informational content such as audio media, video media, and/or interactive computer code. Modern web pages often dynamically respond to user interaction, such that the interaction between the web server 150 and the user 110 is a back and forth process. Many web pages also include ad space for the inclusion of ad impressions that will be provided to users 110 viewing the web page. The web server's 150 owner sells the advertising (ad) space 124 to advertisers 140 as a source of revenue. Advertisers 140 themselves often have their own web pages. Advertisers use advertisements on other web pages (such as those provided by web server 150) in order to help drive user traffic to their own web pages. Many advertisers 140 use their web pages to promote and/or sell goods or services to users 110.

Web pages are sent to users 110 in response to a user's 110 request. In response, the web page hosting server 150 or advertiser's web server 140 will provide the web page's content to the web browser 112. In some instances, if the web page contains advertising content, the provided web page will include computer code indicating where the user 110 can obtain the ad content. This may be simply a web address, or a more sophisticated algorithm.

Advertisers 140 create ad content to be placed in ad spaces on web pages. To obtain ad space 124, advertisers 140 often partner with ad servers 130. Ad servers 130 work on behalf of advertisers 140 to purchase ad space 124 on behalf of advertisers 140. Generally, ad servers 130 try to purchase ad space 124 that is valuable to advertisers 140. There are many different strategies for determining what an advertiser 140 considers valuable, and so often the ad server 130 will work with the advertiser 140 to determine an advertising campaign strategy dictating which ad space 124 the ad server 130 will buy. While the ad server 130 is depicted as a single entity in FIG. 1 for the sake of discussion, the ad server 130 may represent an ad-delivering system that may be implemented using a variety of architectures and configurations having multiple components, modules, and/or servers in communication. For example, the ad-delivering system may include advertisers, ad-delivering servers, demand side platforms (DSPs), ad networks (horizontal and vertical), ad exchanges, analytic platforms, data management platforms, data aggregators, targeted and behavioral advertising platforms, and/or campaign management systems.

In order to assist the advertiser 140 in purchasing ad space 124, the ad server 130 is configured to log users' web traffic to various web pages and store it in a user data store (UDS) 132. The logged web traffic provides the ad server 130 with information regarding the activities, interests, habits, and purchasing decisions of users 110. As introduced in the background above, cookies and pixel tags provide ways for a server to log web page traffic. However, the privacy settings of modern web browsers 112 prevent third parties, such as the ad server 130, from performing a number of functions on a web page controlled by an entity owned by someone other than the ad server 130.

Particularly, modern web browsers 112 often prevent third parties (e.g., the ad server 130) from modifying their own cookies (e.g., an ad server's cookie 116) stored by the web browser. If the user visits the ad server's web page, then the ad server becomes a first party and they can thus edit the ad server cookie 116 (assuming user preferences in the browser are set accordingly). This may be despite the fact that the ad server and the owner of the web page the user is currently visiting (e.g., an advertiser's web page) have an agreement to work together. Thus, despite the fact that the advertiser may trust the ad server, the ad server is still denied access to other first party cookies.

To work around this limitation, the ad server 130 is configured to provide trusted partners with web page computer code that the advertiser will include in its web pages. Generally, this code is included in a pixel tag provided by the ad server to the advertiser, however it may be anywhere within the web page. When the advertiser is the first party, that is when the user is visiting the advertiser's web page, the pixel tag code is treated as a first party by the browser 112 because it is code received from the advertiser 140 rather than the ad server 130. Consequently, the pixel tag code has access to functions of the browser 112 reserved to first parties, rather than only those functions accessible to third parties.

The pixel tag code performs a number of functions. The pixel tag is configured to, when executed by the browser 112, obtain and store user identification numbers (user IDs) in an advertiser's cookie maintained by the advertiser as a first party and stored in the browser 112. The user ID allows for better logging of the user web traffic so that the advertiser 140 and ad server 130 can improve on the advertiser's advertising strategy. The pixel tag is further configured to transmit messages to the ad server 130 regarding the logged user web traffic. Examples of messages may include information regarding a timestamp, the user ID, the type and version of the browser 112 (e.g., Chrome™, Firefox™, Internet Explorer™), an internet protocol (IP) address of the user's computing device operating the browser 112. Other items of information may also be reported in the message.

The user ID is a unique text and/or numerical item of data that by being stored in a cookie maintained by a web browser 112 allows the ad server to log and correlate web traffic associated with a particular browser 112, user computer 110, and/or real world user. In one embodiment, the user ID is encrypted to prevent unauthorized access by anyone other than the ad server 130, and possibly the advertiser 140. In instances where the user ID is encrypted, the ad server 130 may directly or indirectly (e.g., through a partnering advertiser 140) provide an encryption key to allow the web browser 112 and/or the advertiser 140 to decrypt the user ID. The encryption key may be generic to all user IDs, or specific to individual user IDs. An encryption program executed on the ad server 130, advertiser's web server 140, or the browser 112 uses an key to encrypt and/or decrypt the user IDs. user IDs may be encrypted or decrypted at any point in order to ensure the privacy of the user ID, including before and after transmission between computing systems, before and after storage in a cookie (e.g., before it is written and/or before it is read back out by pixel tag code).

Generally, this pixel tag code has the advantage of working around first party/third party browser limitations without comprising the user's privacy and security. If the user chooses to disable first party cookies, or otherwise chooses to opt out of web traffic logging, then the pixel tag will not change that preference and no information will be logged. Further, because the pixel tag code is only provided to advertisers (or other web pages) who have explicitly formed a real world partnership with the ad server, the code will only be present on web pages that trust the ad server. Thus, the pixel tag code in effect represents an acknowledgement of trust between the advertiser and ad server to the web browser, implicitly differentiating the ad server 130 as a trustful third party from other third parties who may have maliciously inserted code into an advertiser's web page without the advertiser's permission.

Computing System Example

Figure 3:
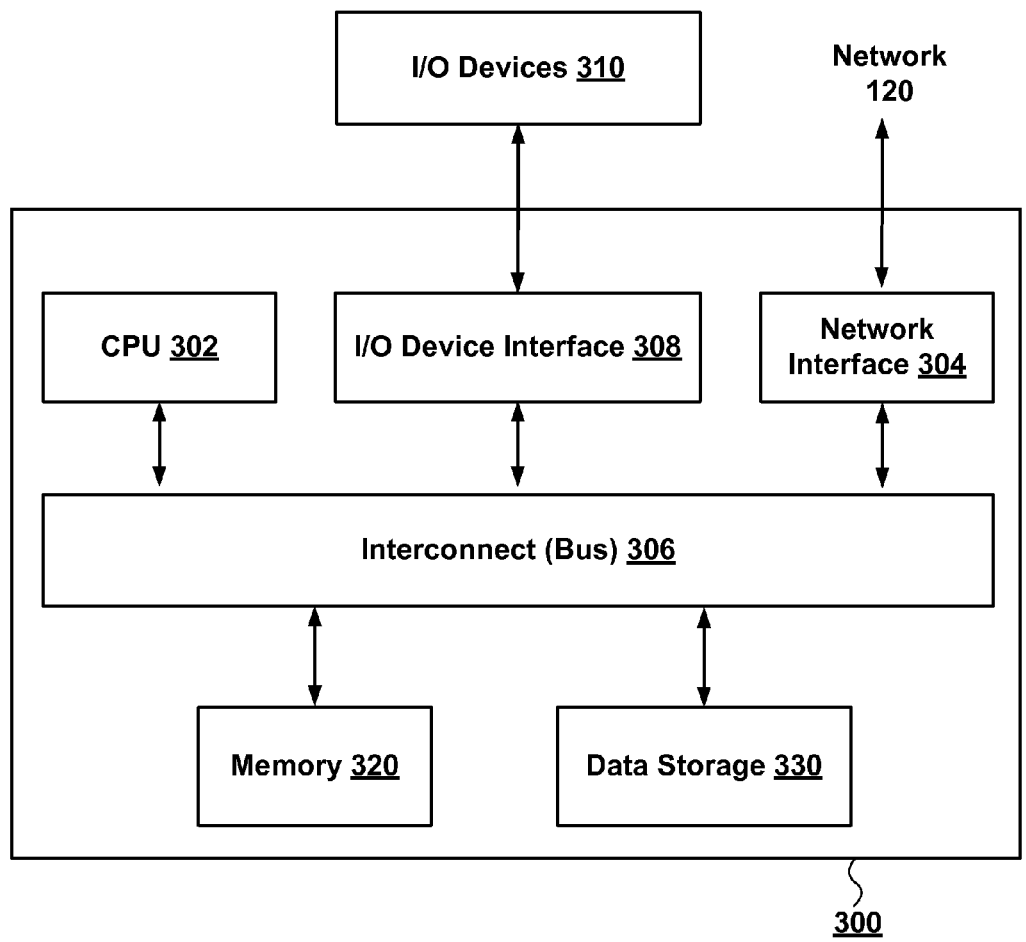
FIG. 3 is a block diagram of a computing system for implementing an ad server, advertiser web server, web page hosting server, or user computer, according to one embodiment.

FIG. 3 is a block diagram of a computing system 300 for implementing an ad server 130, advertiser web server 140, web page hosting server 150, or user computer 110, according to one embodiment. Each type of computing system 300 may include one or more of each conventional component, e.g., a central processing unit (CPU) 302, system memory 320, a data storage 330, input/output (I/O) devices 310 such as a mouse and a keyboard coupled through a I/O device interface 308, output devices such as a monitor, and a network interface 304 for communicating with other computing systems through network 120.

The CPU 302 retrieves and executes programming instructions and application data stored in the memory 320 and generally controls and coordinates operations of other system components. The interconnect bus 306 is used to transmit programming instructions and application data between the CPU 302, I/O devices interface 308, storage 330, network interface 304, and memory 320. The memory 320 is generally included to be representative of a random access memory and, in operation, stores software applications and data for use by the CPU 302. The data storage 330 may be a combination of fixed and/or removable storage devices, such as fixed disc drives, floppy disc drives, hard disk drives, flash memory storage drives, tape drives, removable memory cards, CD-ROM, DVD-ROM, Blu-ray, HD-DVD, optical storage, network attached storage (NAS), or a storage area-network (SAN) configured to store non-volatile data.

Third Party to First Party User Identification

FIGS. 2A through 2D illustrate various embodiments in which a third party ad server is granted access to a first party cookie of a partnered advertiser in order to write and/or read a user ID that is used by the ad server in order to more conveniently log user web traffic. Without limitations, this user ID can be transmitted to the ad server and/or to other web servers as part of an URL, data payload, or pixel firing. The embodiments differ with respect to: how the user ID is generated and received by the user's web browser 112 for writing to the advertiser's first party cookie; and how the user ID affects both the computer code included in the advertiser's web page that controls the web browser's 112 behavior, and also affects the interactions between the browser 112, the advertiser 140, and the ad server 130.

Advertiser Generates New User ID

Figure 2A:
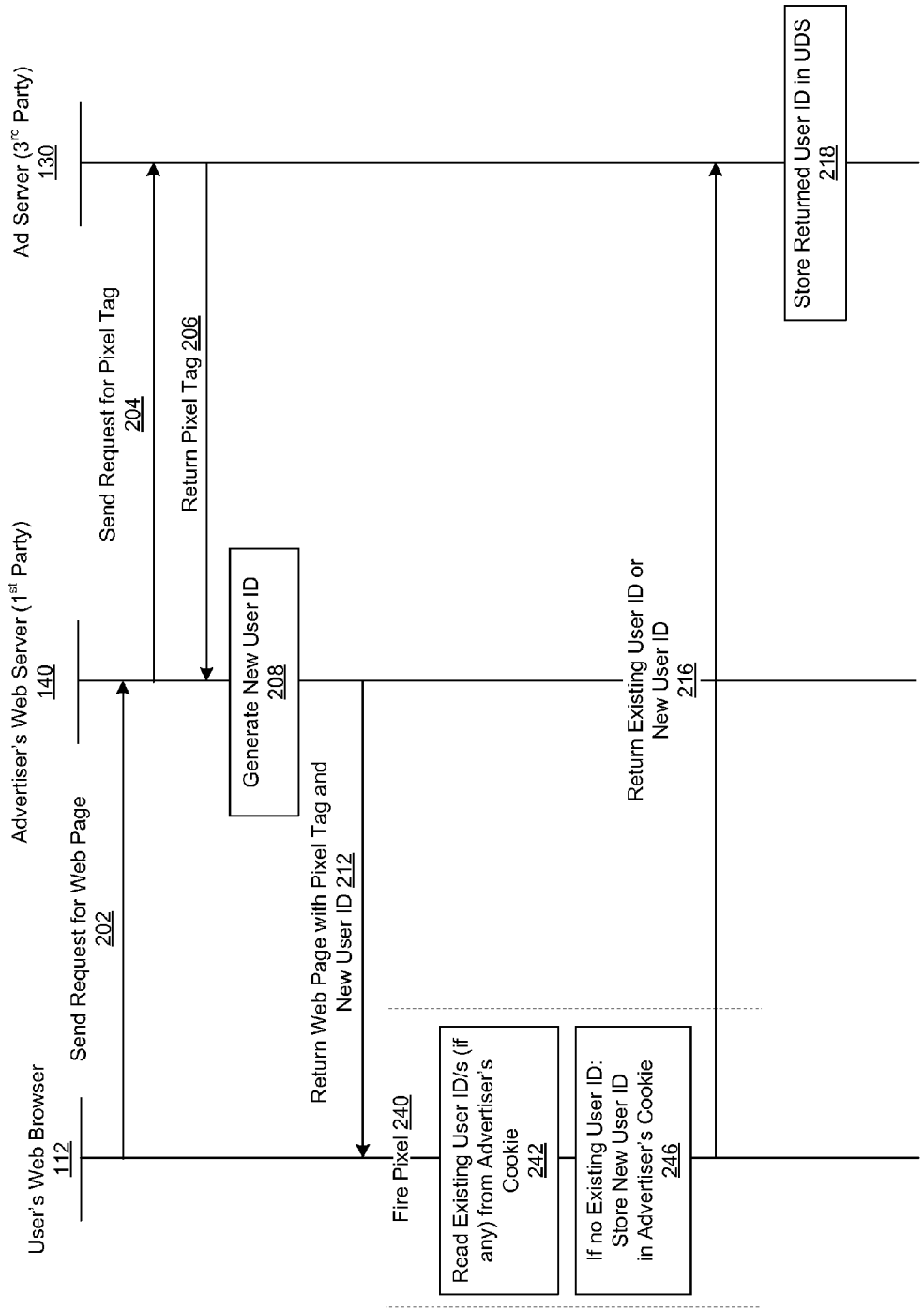
FIG. 2A illustrates an interaction diagram of a user's web browsing session where a third party ad server's computer code is used as part of an advertiser's web page to provide access to the advertiser's first party cookie to write a user identification number (user ID) generated by the advertiser, according to one embodiment.

FIG. 2A illustrates an interaction diagram of a user's web browsing session where a third party ad server's computer code is used as part of an advertiser's web page to provide access to the advertiser's first party cookie to write a user identification number (user ID) generated by the advertiser, according to one embodiment. During the web browsing session, the user 110 sends 202, using web browser 112, a request for a web page from an advertiser's web server 140, where the advertiser 140 has partnered with the ad server 130.

The requested web page includes, in addition to other web page content, computer code provided by the partner ad server 130. The computer code includes a pixel tag configured to be executed by the browser 112. The pixel tag may include or reference additional computer code configured to grant the ad server 130, as a third party, the ability access to the advertiser's first party cookie. In one embodiment, the pixel tag may be requested 204 for inclusion in a web page and returned 206 by the ad server 130 responsive to the user's 110 web page request 202. This is useful where the pixel tag contains computer code that is tailored to each user 110 or browser type 112, such that each request 202 may require different computer code to be included in the returned response 206. An example of specifically tailored code may be encryption information for a user ID.

In another embodiment, the pixel tag may be generated in advance and provided to the advertiser in advance of the request 202. This is useful where the pixel tag contains the same computer code regardless of who is making the web page request 202. In yet another embodiment, portions of the pixel tag may be static between requests 202, whereas other portions of the pixel tag are generated dynamically by the advertiser's web server 140 or requested 204 from the ad sever 130 responsive to a request 202.

Prior to returning the requested web page to the user, the advertiser's web server 140 generates a new user ID to be transmitted back to the browser 112 along with the web page. Generally, the ad server 130 will provide the advertiser's web server 140 with computer code configured to be executed on the advertiser's web server 140 to generate the user ID. In order to ensure that different advertisers (not shown) that all partner with the same ad server 130 do not generate duplicate user IDs, the computer code provided by the ad server to each advertiser's web server 140 may create different user IDs that are unique to each advertiser. In this manner, the ad server 130 is able to distinguish user IDs generated by different advertisers.

The advertiser's web server 140 then returns 212 the requested web page to the user's web browser 112 including the new user ID and the pixel tag. By virtue of the fact that the user has explicitly requested the advertiser's web page, the user is considered to be a visitor to the advertiser's web server 140 by the browser 112. Thus, the browser 112 recognizes the advertiser 140 as a first party, such that computer code received from the advertiser's web server 140 has increased access to perform functions made available by the web browser 112. If the web page contains links to code from other sources, i.e. the ad server 130, those sources are considered third parties, and thus the browser 112 limits the functions made available to their computer code.

Upon receipt of the web page, the web browser 112 executes the computer code that makes up the web page. As part of this, the web browser 112 executes ("fires") 240 the computer code embedded in the pixel tag. Owing to the partnership between the ad server 130 and the advertiser, and because the pixel tag and user ID were received from the advertiser's web server 140 rather than the ad server 130, the pixel tag and user ID are considered first party computer code rather than third party code. Thus, the pixel tag code is granted greater access to functions made available by the browser than similar code directed by the ad server 130 to the browser 112.

As part of the execution 240 of the pixel tag code, the web browser 112 accesses the first party cookie associated with the advertiser's web server 140 on the user's web browser 112. The pixel tag code includes instructions to attempt to read 242 any existing (or previously created) user IDs from the cookie, for example a user ID stored during a prior transaction between the web browser 112 and the advertiser's web server 140. If the cookie does not contain any existing user IDs, the browser 112 writes 246 the new user ID to the advertiser's first party cookie.

Further execution of the pixel tag causes the web browser 112 to transmit 216 a message to the ad server 130. This message may include any existing user IDs (if any) stored in the advertiser's first party cookie and/or the new user ID. The message can also include other information, for example a timestamp of the web browsing session, the browser's type and version, the user's IP address, and any web page browsing activities undertaken by the user during the web-browsing session (e.g., mouse and keyboard actions, web page interactions, etc.).

Upon receipt of this message, the ad server 130 obtains the user ID/s from the message and searches the UDS for the user ID/s. If the UDS database already contains records associated with one of the one or more user IDs from the message, the other information in the message is logged in the UDS as being associated with that user ID. If no records exist in the UDS regarding any of the one or more user IDs from the message, the ad server stores 218_a_ new entry in the UDS for that user ID, and logs the remainder of the message's content with respect to that new entry.

It is expected that in some instances, more than one user ID may be present in the message. The ad server 130 is configured to correlate and/or merge UDS user ID entries regarding multiple user IDs from a single message. Further, any given entry in the UDS may be associated with more than one user ID. At a general level, this allows the ad server to correlate the web browsing activity from multiple user IDs as actually being the result of web browsing behavior of a single user 110 and/or browser 112.

Pixel Tag Causes Web Browser to Generate New User ID

Figure 2B:
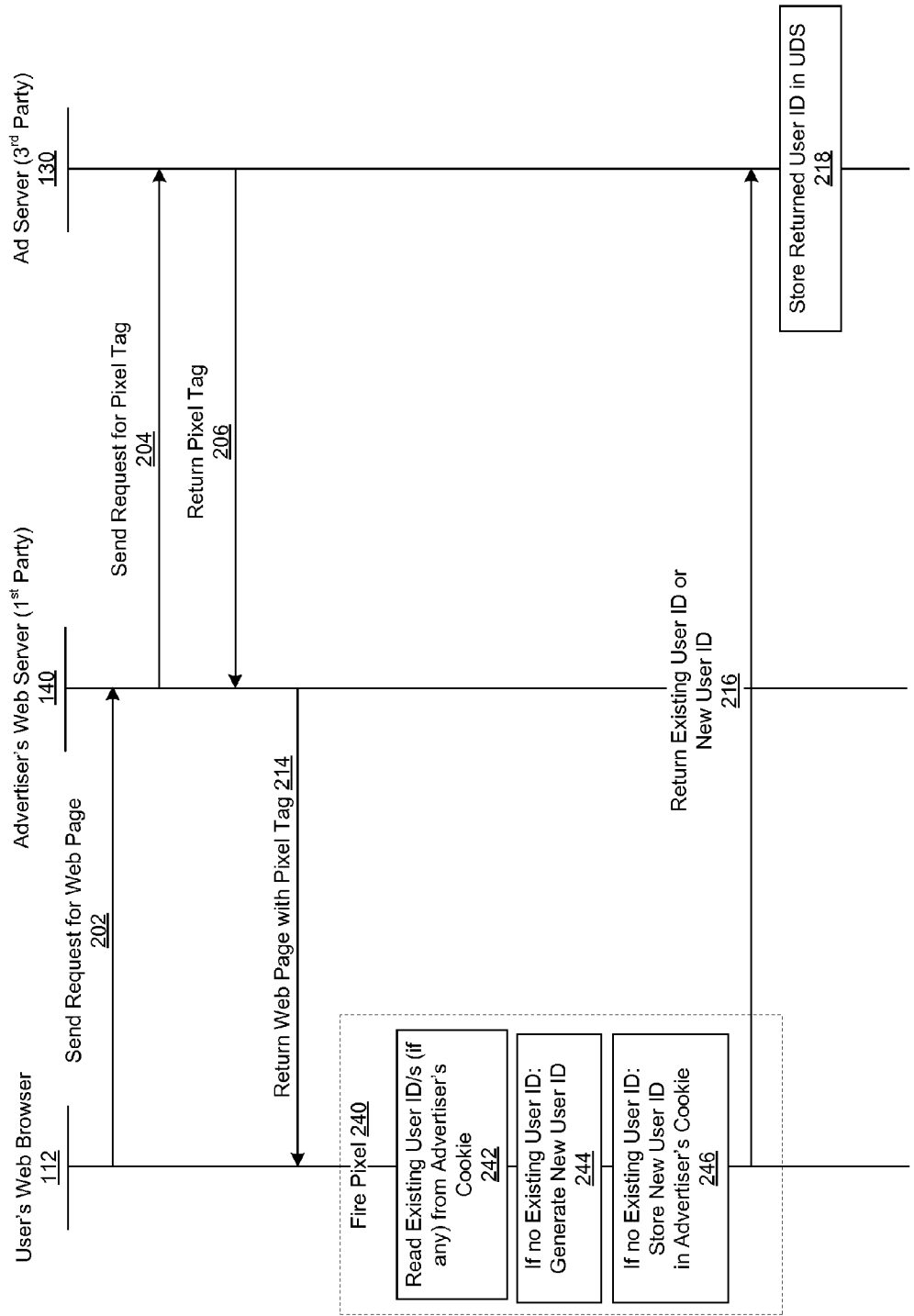
FIG. 2B illustrates an interaction diagram of a user's web browsing session where a third party ad server's computer code is used as part of an advertiser's web page to provide access to the advertiser's first party cookie to write a user ID generated by computer code present in a pixel tag, according to one embodiment.

FIG. 2B illustrates an interaction diagram of a user's web browsing session where third party ad server's computer code is used as part of an advertiser's web page to provide access to the advertiser's first party cookie to write a user ID generated by computer code present in a pixel tag, according to one embodiment. One difference between the embodiments in FIGS. 2A and 2B includes the computing system where the new user ID is generated. In the embodiment as illustrated in FIG. 2B the advertiser's web page received at web browser 112 includes computer code (e.g., as part of the pixel tag embedded in the web page) that generates a new user ID if the advertiser's first party cookie contains no previously stored user ID, in contrast to the embodiment of FIG. 2A where the advertiser's web server 140 generates a new user ID and returns it as part of the web page along with the pixel tag. This process is further described immediately below.

Similarly to FIG. 2A, the user sends 202a request for an advertiser's web page through the web browser 112. As above, the requested web page includes a pixel tag including computer code from an ad server 130 partnering with the advertiser. However, as compared to FIG. 2A, the requested web page does not include a new user ID. The advertiser's web server 140 then returns the requested web page 214 with the pixel tag to the user's web browser 112. As above, the browser 112 recognizes the advertiser 140 as the first party and the ad server as the third party. Upon receipt of the web page 212, the web browser 112 fires 240 the pixel tag. As part of the execution of the pixel tag code, the web browser 112 accesses the advertiser's first party cookie. The pixel tag code further causes the web browser 112 to attempt to read 242 any existing user ID/s that may be stored in the cookie as a result of prior transactions between the web browser 112 and the advertiser's web server 140.

If the advertiser's first party cookie does not contain any user IDs, the code of the pixel tags causes the browser 112 to generate 244 and store 246a new user ID in the cookie. The computer code in the pixel tag used to generate the new user ID is generally expected to be provided by the ad server 130. As above, to ensure that web browsers 112 accessing web pages from different advertisers (not shown) do not generate duplicate user IDs, the pixel tag computer code provided to each advertiser for inclusion in their web pages may create different user IDs that are unique to each advertiser. In this manner, the ad server 130 is able to distinguish user IDs generated by different browsers accessing different advertiser's web pages. To further prevent duplication, the pixel tag code may include an algorithm configured to incorporate a time, geographic location, or a user's 110 specific item of information to ensure that different browsers 112 accessing the same advertiser 140 do not generate duplicate new user IDs.

Further execution of the pixel tag causes the browser 112 to transmit 216a message to the ad server 130 including the user ID stored in the cookie and additional information regarding the user's web browsing behavior. As above, the ad server 130 is configured to store 218 the message in the UDS by user ID. The ad server 130 may also perform additional functions, such as correlating multiple user IDs that relate to the same single user 110 as described above.

Ad Server Provides New User ID Responsive to Request

Figure 2C:
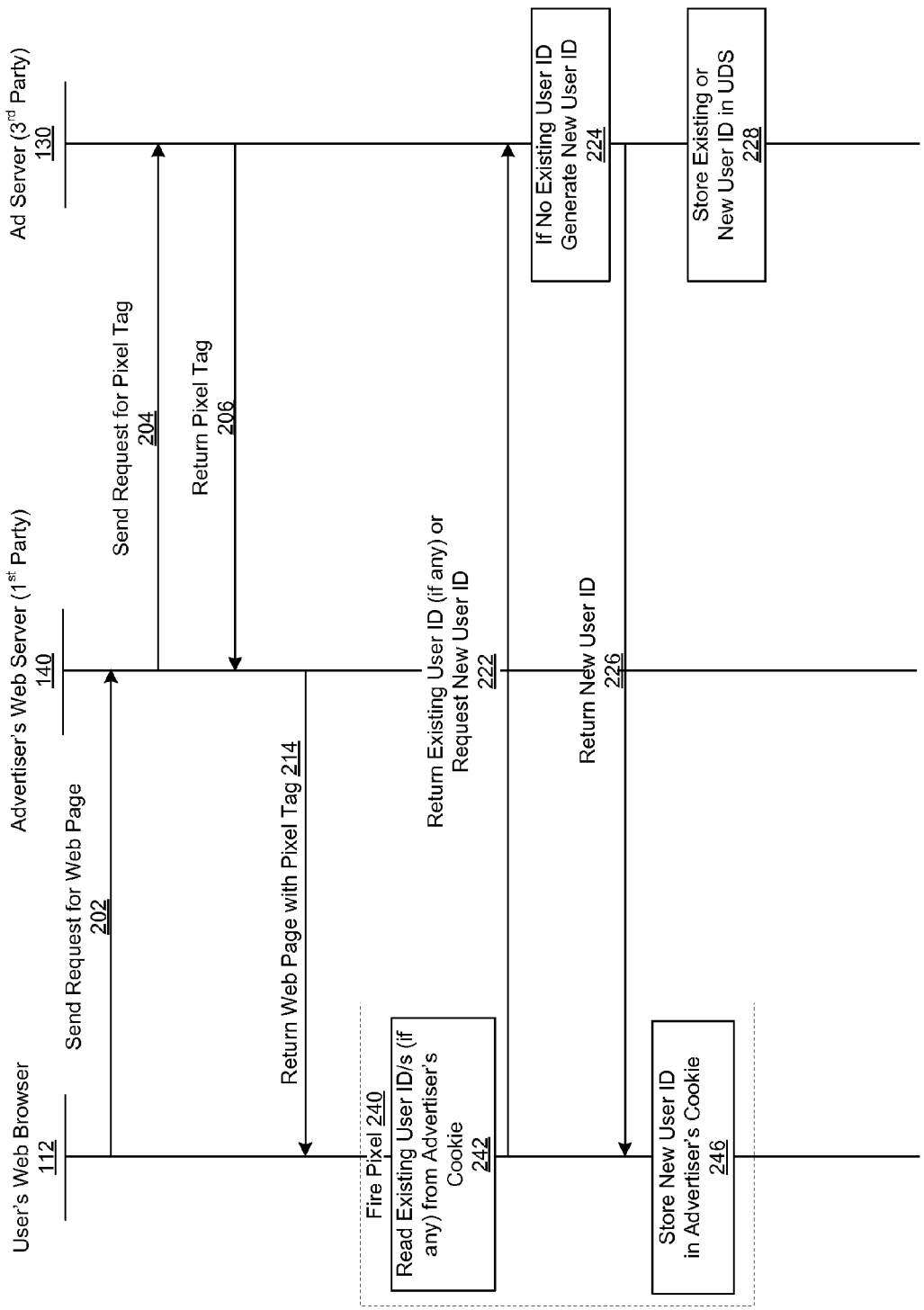
FIG. 2C illustrates an interaction diagram of a user's web browsing session where a third party ad server's computer code is used as part of an advertiser's web page to provide access to the advertiser's first party cookie to write a user ID generated by the ad server, according to one embodiment.

FIG. 2C illustrates an interaction diagram of a user's web browsing session where a third party ad server's computer code is used as part of an advertiser's web page to provide access to the advertiser's first party cookie to write a user ID generated by the ad server, according to one embodiment. One difference between this embodiment and the embodiments detailed in FIGS. 2A and 2B also includes how new user IDs are generated. In the embodiment illustrated in FIG. 2C, the web browser 112 first determines whether or not the advertiser's first party cookie contains an existing user ID. If not, the web browser 112 requests 222, and the ad server 130 returns 226, a new user ID. In one embodiment, to perform the request 222 and response 226, the computer code (e.g., pixel tag code) initiating these communications makes use of a cross site scripting workaround or an express authorization between the advertiser 140 and ad server 130. Alternatively, if an existing user ID is present in the cookie, the existing user ID is returned 222 as part of the message sent to the ad server 130. This process is further described immediately below.

Similarly to FIGS. 2A and 2B, the user sends 202a request for an advertiser's web page through the web browser 112. As above, the requested web page includes a pixel tag including computer code from an ad server 130 partnering with the advertiser 140. Similarly to FIG. 2B, the requested web page does not include a new user ID. The advertiser then returns 214 the requested web page with the pixel tag to the user's web browser 112. As above, the browser 112 recognizes the advertiser's web server 140 as the first party and the ad server 130 as the third party. Upon receipt of the web page 212, the web browser 112 fires 240 the pixel tag. As part of the execution of the pixel tag code, the web browser 112 accesses the advertiser's first party cookie. The pixel tag code further causes the web browser 112 to attempt to read 242 any existing user ID that may be stored in the cookie as a result of prior transactions between the web browser 112 and the advertiser's web server 140.

If the advertiser's first party cookie does not contain a user ID, the code of the pixel tags causes the browser 112 to request 222a new user ID from the ad server 130. In one embodiment, the request 222 includes an empty user ID as a signal to the ad server 130 that a new user ID is requested. The request 222 may also include additional information, such as the user's web browsing behavior as described above. Responsive to receiving the request 222, the ad server 130 generates 224a new user ID and uses it to store 228 the other content (e.g., web browsing behavior) of the request 222 as being associated with the newly generated user ID. The ad server 130 also returns 226 the new user ID to the web browser 112. The order of the return 226 and storage 228 may vary in different implementations. Responsive to receiving the returned 226 new user ID, the pixel tag computer code causes the web browser 112 to store the new user ID in the advertiser's first party cookie. This user ID may later be used upon future visits by the user 110 to the advertiser's web page.

As mentioned above, the request 222 to the ad server 130 for the user ID and the response 226 received from the ad server 130 may be treated as third party communications/third party data. Consequently, some browsers 112 may disallow the user ID from being written to the advertiser's first party cookie. In order to address this issue, the pixel tag code, and/or the web page code generally, may be configured to make use of a cross site scripting workaround. Alternatively, it is contemplated that the advertiser 140 may be able to authorize the ad server 130, such that data and communications between the web browser 112 and the ad server 130 are treated as if the ad server 130 is a first party when the web browser is executing the computer code of the advertiser's web page.

If, on the other hand, the advertiser's first party cookie does contain a user ID, the code of the pixel tag causes the browser 112 to return 222 that user ID in a message to the ad server 130. As above, the message may also include the user's web browsing behavior. Also as above, the ad server 130 is configured to store 218 the message in the UDS according to the returned 226 user ID. The ad server 130 may also perform additional functions, such as correlating multiple user IDs that relate to the same single user 110 as described above.

In an alternative embodiment, a meta refresh causes the advertiser's web page to be reloaded while directing the request 222 to ad server 130.

New User ID Received as Argument in Web Page Request

Figure 2D:
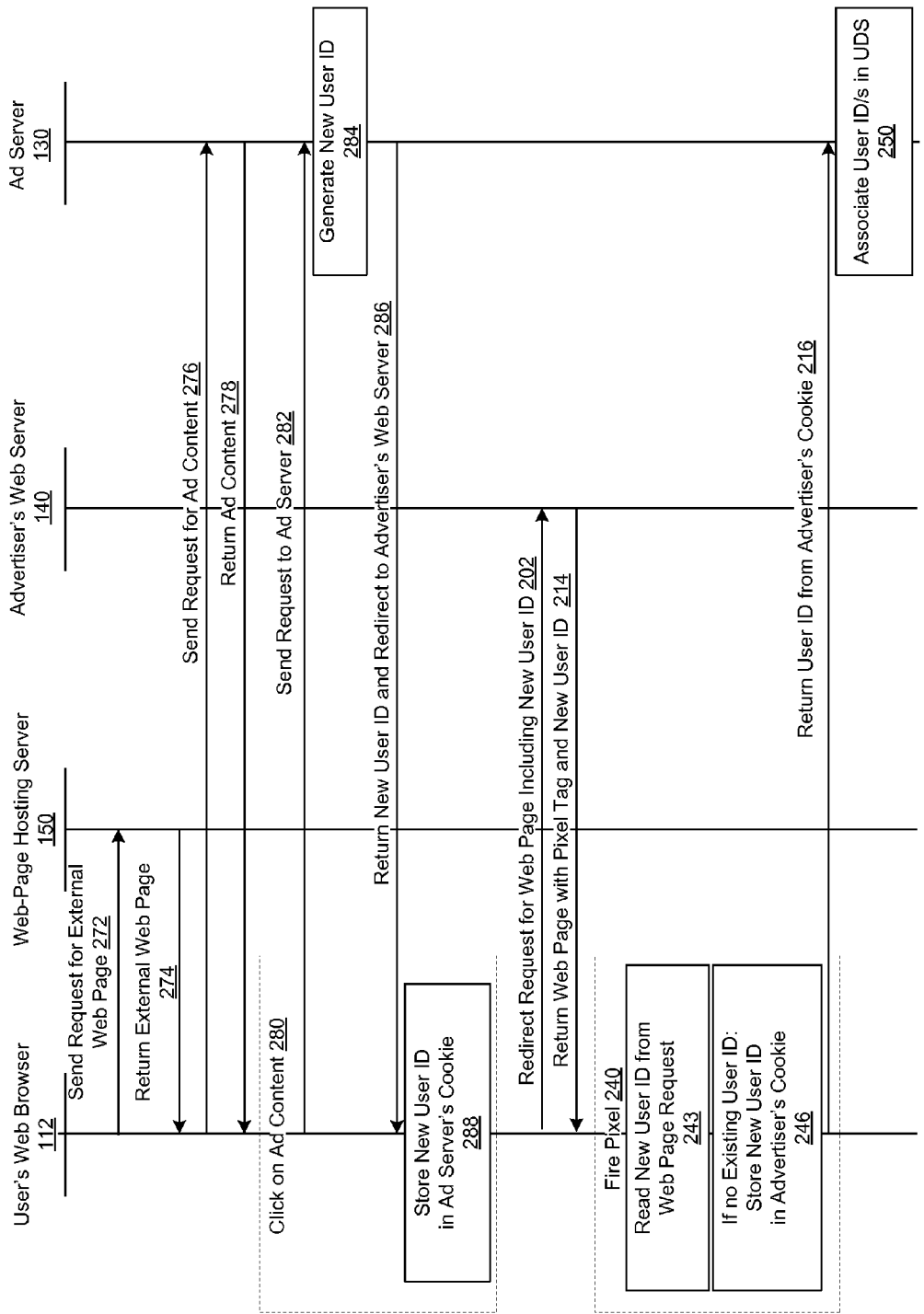
FIG. 2D illustrates an interaction diagram of a user's web browsing session where a third party ad server's computer code is used as part of an advertiser's web page to provide access to the advertiser's first party cookie to write a user ID received as part of a web page request to an advertiser's web server, according to one embodiment.

FIG. 2D illustrates an interaction diagram of a user's web browsing session where a third party ad server's computer code is used as part of an advertiser's web page to provide access to the advertiser's first party cookie to write a user ID received as part of a web page request to an advertiser's web server, according to one embodiment. One difference between this embodiment and the embodiments detailed in FIGS. 2A, 2B, and 2C also includes how new user IDs are generated.

The embodiment illustrated in FIG. 2D assumes a use case where the user 110 is accessing the advertiser's web page as a result of a click action (or another similar action) on another external web page maintained by another web server 150. In this embodiment, rather than being directly routed from the external web server's 150 web page to the web page on the advertiser's web server 140, the user is instead briefly redirected through the ad server 130. During the brief redirection, the ad server 130 has the opportunity, as a first party, to write a new user ID to an ad server's 130 first party cookie on the user's browser 112. The user's browser 112 is then redirected to the web page on the advertiser's web server 140, where the new user ID from the ad server's first party cookie is then passed as an argument to the advertiser's web server 140, which then includes it as part of the web page provided to the web browser 112. With the advertiser's web server 140 now being the first party due to the redirected request the pixel tag causes the browser to write the new user ID to the advertiser's first party cookie, if no user ID is already stored in that cookie, and the stored user ID to be returned to the ad server for web traffic logging as described above. This process is further described immediately below.

During this web browsing session, the user 110 sends 272a request for a web page that is external to the advertiser's web server 140, for example a web page hosted by an external web server 150. The web server 150 returns 274 the requested web page to the browser 112. The computer code of the returned 274 web page includes computer code specifying that at least some of the content of the web page must be obtained from the ad server 130, or another external server affiliated with the ad server and/or the advertiser's web server 140 (e.g., a content delivery network). Often this content is ad content that the ad server 130 has purchased on behalf of the advertiser. For example, the ad content may be an impression of an advertisement created by the advertiser to advertise its goods or services. Responsive to this web page's code, the browser 112 sends a request for ad content to the ad server 130, which returns 278 the ad content in the form of computer code to be included as part of the web page.

In one example, the browser 112 then processes a user interaction (e.g., a mouse click) with the ad content. The user 110 interacting with the ad may ultimately lead to the user 110 visiting the advertiser's web page. The computer code of the ad content, however, first sends 282 the user to the ad server 130. This may be accomplished by including the ad server's web address in the ad content code and/or by making use of a HTTP redirection status code, or a similar segment of computer code (e.g., a meta refresh). This causes the browser 112 to request content (e.g., a web page) from the ad server 130. In another embodiment the same effect is achieved by use of iframes that are inline frames placed inside an HTML document.

By sending 282 the web browser 112 first to the ad server 130, even though only briefly, the ad server 130 is treated as a first party by the browser 112. Thus, the ad server 130 gains the ability to have the browser 112 execute functions permitted to first parties. Responsive to this, the ad server 130 causes the browser 112 to create an ad server's 130 first party cookie to be stored with the browser 112. The ad server 130 further generates (or causes the browser to generate 112) a new user ID that is stored 288 in the ad server's 130 first party cookie. If an ad server's 130 first party cookie already exists then the ad server 130 causes the browser 112 to read (not shown) out any existing user ID stored in the ad server's 130 first party cookie. For the remainder of the discussion of the embodiment of FIG. 2D, it is assumed that the ad server's 130 first party cookie does not have an existing user ID, and thus the explanation proceeds by describing the use involving the new user ID. If the ad server's 130 first party cookie already contains an existing user ID, the remainder of this explanation would be the same, except the new user ID would be replaced with the existing user ID from the ad server's 130 first party cookie.

The ad server 130 then redirects the web browser 112, causing the web browser 112 to request 202a web page from the advertiser's web server 140. The web address of the advertiser's web page may have been included in the original ad content received as part of the external web page, or alternatively it may have been passed to the browser 112 by the ad server 130 subsequent to the initial request to the ad server 130. Particularly, in one embodiment this web address is transmitted as part of the payload of the returned response, or in an alternative embodiment the web address is transmitted as part of the returned URL.

The request 202 to the advertiser's web server 140 for its web page includes the new user ID from the ad server's 130 first party cookie. As above, the requested web page includes a pixel tag comprising computer code from the ad server 130 partnering with the advertiser. The advertiser's web server 140 then returns the requested web page 214 with the pixel tag to the user's web browser 112 along with the new user ID received as part of the request 202. As above, the browser 112 now recognizes the advertiser's web server 140 as the first party and the ad server 130 as a third party.

Upon receipt of the web page 212, the web browser 112 fires 240 the pixel tag. As part of the execution of the pixel tag code, the web browser 112 reads 243 the new user ID included with the web page. The web browser 112 then accesses the first party cookie of the advertiser's web server 140. The new user ID is stored in the first party cookie of advertiser's web server 140, if no user ID already exists in this cookie. In one particular embodiment, more than one user ID can be stored in the first party cookie advertiser's web server 140, which the ad server 130 can later correlate as being associated with a same user 110.

Further execution of the pixel tag causes the browser 112 to transmit 216a message to the ad server 130 including the user ID stored in the first party cookie of the advertiser's web server 140 and additional information regarding the user's 110 web browsing behavior. As above, the ad server 130 is configured to store 218 the message in the UDS by user ID. The ad server 130 may also perform additional functions, such as correlating multiple user IDs that relate to the same single user 110 as described above.

Additional Considerations

As described above, in various embodiments the user ID is encrypted to prevent unauthorized access. In one possible implementation, the user ID is encrypted using an encryption key that is passed along with the pixel tag and is generated and stored on the ad server 130. When user ID is subsequently generated, the encryption key retrieved from the pixel code and utilized in the generation of an encrypted user ID.

In various embodiments, an encryption key may be tied to one or more attributes. For example, the encryption key may also be tied to the web address of the web page in which the pixel tag is embedded. In such an implementation, if the encoding operation is executed outside of that specific web page, or more generally outside the web browser 112 currently displaying the web page, the encryption operation, and thus the generation of a user ID, would fail. Further, the encryption server, which is generally the ad server 130, generates the encryption key based on the attribute received by the encryption server with a encryption key request, such as a time function, a user function or a static key.

Various other embodiments of the invention may be implemented as a computer program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow.

The invention claimed is:

1. A method comprising:
receiving an external web page from a hosting server web address through a web browser running on a computer having a processor and a non-transitory computer readable storage medium, the web browser associated with a user;
receiving ad content for the external web page, the ad content comprising an ad server's web address;
receiving a user input regarding the ad content;
responsive to the user input, sending a data request to the ad server's web address;
receiving a response to the data request comprising an advertiser's web address associated with an advertiser's web page and a new user identification (user ID), the advertiser's web address different from the ad server's web address;
sending a request to the advertiser's web address including the new user ID;
receiving the advertiser's web page from the advertiser, the advertiser's web page comprising the new user ID and computer code configured to notify the ad server regarding the user's visit to the advertiser's web page; and
writing, within the non-transitory computer readable storage medium, the new user ID to a first party cookie of the advertiser in association with the web browser.

2. The method of claim 1, wherein the response to the data request further comprises a first party cookie of the ad server, the first party cookie of the ad server comprising the new user ID; and wherein the method further comprises storing the first party cookie of ad server as part of the web browser.

3. The method of claim 1, wherein the ad server is configured to log the user's visit to the advertiser's web page, and to associate the log with the new user ID.

4. The method of claim 1 further comprising executing the computer code, the executing comprising:
determining whether the first party cookie comprises an existing user ID; and
responsive to the presence of an existing user ID sending the existing user ID to the ad server's web address.

5. The method of claim 4, wherein the ad server is configured to log the user's visit to the advertiser's web page, and to associate the logs with the existing user ID.

6. The method of claim 1, wherein the user ID is encrypted.

7. The method of claim 6, wherein the response to the data request further comprises a uniform resource locator (URL), the URL further comprising the advertiser's web address and the encrypted user ID.

8. A non-transitory computer-readable storage medium configured to store executable computer code that when executed is configured to:
receive an external web page from a hosting server web address through a web browser associated with a user;
receive ad content for the external web page, the ad content comprising an ad server's web address;
receive a user input regarding the ad content;
responsive to the user input, send a data request to the ad server's web address;
receive a response to the data request comprising an advertiser's web address associated with an advertiser's web page and a new user identification (user ID), the advertiser's web address different from the ad server's web address;
send a request to the advertiser web address including the new user ID;
receiving the advertiser's web page from the advertiser, the advertiser web page comprising the new user ID and additional computer code;
execute the additional computer code, comprising:
write the new user ID to an advertiser cookie in association with the web browser;
and
notify the ad server regarding the user's visit to the advertiser's web page.

9. The non-transitory computer-readable storage medium of claim 8, wherein the response to the data request further comprises a first party cookie of the ad server, the first party cookie of the ad server comprising the new user ID; and wherein the non-transitory computer-readable storage medium is further configured to store the first party cookie of ad server as part of the web browser.

10. The non-transitory computer-readable storage medium of claim 8, wherein the ad server is configured to log the user's visit to the advertiser's web page, and to associate the logs with the new user ID.

11. The non-transitory computer-readable storage medium of claim 8 is further configured to execute the computer code, the executing comprising:
determining whether the first party cookie comprises an existing user ID; and
responsive to the presence of an existing user ID sending the existing user ID to the ad server's web address.

12. The non-transitory computer-readable storage medium of claim 11,
wherein the ad server is configured to log the user's visit to the advertiser's web page, and to associate the logs with the existing user ID.

13. The non-transitory computer-readable storage medium of claim 8, wherein the user ID is encrypted.

14. The non-transitory computer-readable storage medium of claim 13, wherein response to the data request further comprises a uniform resource locator (URL), the URL further comprising the advertiser's web address and the encrypted user ID.

15. A computer system comprising a computer processor, and a memory storing a web browser software application that when executed causes the processor to:
- receive an external web page from a hosting server web address through the web browser, the web browser associated with a user;
- receive ad content for the external web page, the ad content comprising an ad server's web address;
- receive a user input regarding the ad content;
- responsive to the user input, send a data request to the ad server's web address;
- receive a response to the data request comprising an advertiser's web address associated with an advertiser's web page and a new user identification (user ID), the advertiser's web address different from the ad server's web address;
- send a request to the advertiser's web address including the new user ID;
- receive the advertiser's web page from the advertiser, the advertiser's web page comprising the new user ID and computer code configured to notify the ad server regarding the user's visit to the advertiser's web page; and
- write the new user ID to a first party cookie of the advertiser in association with the web browser.

16. The system of claim 15, wherein the response to the data request further comprises a first party cookie of the ad server, the first party cookie of the ad server comprising the new user ID; and wherein the method further comprises storing the first party cookie of ad server as part of the web browser.

17. The system of claim 15, wherein the ad server is configured to log the user's visit to the advertiser's web page, and to associate the log with the new user ID.

18. The system of claim 15, wherein the web browser when executed further causes the processor to:
- determine whether the first party cookie comprises an existing user ID; and
- responsive to the presence of an existing user ID, send the existing user ID to the ad server's web address.

19. The method of claim 18, wherein the ad server is configured to log the user's visit to the advertiser's web page, and to associate the logs with the existing user ID.

20. The method of claim 15, wherein the user ID is encrypted.

21. The method of claim 20, wherein the response to the data request further comprises a uniform resource locator (URL), the URL further comprising the advertiser's web address and the encrypted user ID.

* * * * *